United States Patent [19]

Bierschenk et al.

[11] Patent Number: 5,539,059

[45] Date of Patent: Jul. 23, 1996

[54] PERFLUORINATED POLYETHERS

[75] Inventors: Thomas R. Bierschenk; Timothy Juhlke, both of Round Rock; Hajimu Kawa; Richard J. Lagow, both of Austin, all of Tex.

[73] Assignee: Exfluor Research Corporation, Round Rock, Tex.

[21] Appl. No.: 469,216

[22] Filed: Jun. 6, 1995

Related U.S. Application Data

[63] Continuation-in-part of Ser. No. 125,535, Sep. 22, 1993, abandoned, which is a continuation of Ser. No. 982,030, Nov. 24, 1992, abandoned, which is a continuation of Ser. No. 789,420, Nov. 4, 1991, abandoned, which is a continuation of Ser. No. 414,134, Sep. 28, 1989, abandoned, which is a continuation-in-part of Ser. No. 251,135, Sep. 28, 1988, abandoned.

[51] Int. Cl.$^6$ .................. C07C 17/02; C07C 19/02
[52] U.S. Cl. .................. 525/331.6; 204/157.95; 204/157.96; 204/157.97; 204/158.1; 204/158.11; 525/356; 525/357; 525/409; 549/428; 549/504; 549/540; 549/550; 558/54; 560/227; 560/229; 562/101; 562/113; 562/603; 562/605
[58] Field of Search .................. 525/331.6, 356, 525/357, 409; 204/157.95, 157.96, 157.97, 158.1, 158.11; 549/428, 504, 540, 550; 558/54; 560/227, 229; 562/101, 113, 603, 605; 564/496, 510; 568/407, 419, 615, 683, 684, 842; 570/129, 134, 137

[56] References Cited

U.S. PATENT DOCUMENTS

| | | | |
|---|---|---|---|
| 2,765,559 | 9/1956 | Wilkins | 260/2 |
| 2,839,513 | 6/1958 | Ahlbrecht et al. | 260/86.1 |
| 2,856,370 | 10/1958 | Muetterties | 260/2 |
| 3,125,599 | 3/1964 | Warnell | 260/535 |
| 3,205,183 | 9/1965 | Vandenberg | 260/2 |
| 3,250,806 | 5/1966 | Warnell | 260/535 |
| 3,303,145 | 2/1967 | Carlson | 260/2 |
| 3,311,569 | 3/1967 | Smith et al. | 260/2 |
| 3,313,741 | 4/1967 | Uelzmann et al. | 260/2 |
| 3,341,475 | 9/1967 | Vandenberg | 260/2 |
| 3,344,088 | 9/1967 | Miller | 260/2 |
| 3,358,003 | 12/1967 | Eleuterio et al. | 549/531 |
| 3,393,157 | 7/1968 | Janssen et al. | 260/2 |
| 3,412,148 | 11/1968 | Arbogast | 260/544 |
| 3,417,033 | 12/1968 | Weissermel et al. | 260/2 |
| 3,505,411 | 4/1970 | Rice | 260/615 |
| 3,515,701 | 6/1970 | Tiers | 260/78.4 |
| 3,536,733 | 10/1970 | Carlson | 549/550 |
| 3,665,041 | 5/1972 | Sianesi et al. | 260/615 A |
| 3,770,792 | 11/1973 | Sianesi et al. | 260/463 |
| 3,787,320 | 1/1974 | Erdmann et al. | 252/54 |
| 3,810,874 | 5/1974 | Mitsch et al. | 260/75 |
| 3,847,978 | 11/1974 | Sianesi et al. | 260/535 |
| 3,849,504 | 11/1974 | Mitsch | 260/615 |
| 3,897,502 | 7/1975 | Russell et al. | 260/614 |
| 4,281,119 | 7/1981 | Lagow et al. | 544/106 |
| 4,356,291 | 10/1982 | Darling | 525/403 |
| 4,513,116 | 4/1985 | Kowalski et al. | 525/53 |
| 4,523,039 | 6/1985 | Lagow et al. | 568/615 |
| 4,657,687 | 4/1987 | Caporiccio et al. | 252/54 |
| 4,675,452 | 6/1987 | Lagow et al. | 568/601 |
| 4,686,024 | 8/1987 | Scherer, Jr. et al. | 204/157.95 |
| 4,687,696 | 8/1987 | Satoji | 428/192 |
| 4,687,821 | 8/1987 | Ezzell et al. | 526/247 |
| 4,755,567 | 7/1988 | Bierschenk et al. | 525/409 |
| 4,760,198 | 7/1988 | Bierschenk et al. | 568/615 |
| 4,816,545 | 3/1989 | Re et al. | 528/401 |
| 4,827,042 | 5/1989 | Lagow et al. | 568/603 |
| 4,833,274 | 5/1989 | Caporiccio et al. | 570/137 |
| 4,847,427 | 7/1989 | Nappa | 568/615 |
| 4,859,747 | 8/1989 | Bierschenk et al. | 525/409 |
| 4,931,199 | 6/1990 | Bierschenk et al. | 252/68 |
| 4,943,595 | 7/1990 | Scherer, Jr. et al. | 514/722 |
| 4,960,951 | 10/1990 | Nappa et al. | 568/615 |
| 4,973,716 | 11/1990 | Calini et al. | 549/504 |
| 5,076,949 | 12/1991 | Kalota et al. | 662/54 |
| 5,093,432 | 3/1992 | Bierschenk et al. | 525/331.6 |
| 5,120,459 | 6/1992 | Kalota et al. | 252/54 |

FOREIGN PATENT DOCUMENTS

| | | |
|---|---|---|
| 0148482 | 7/1985 | European Pat. Off. . |
| 0203348 | 12/1986 | European Pat. Off. . |
| 0239123 | 9/1987 | European Pat. Off. . |
| 0247887 | 12/1987 | European Pat. Off. . |
| 0293863 | 12/1988 | European Pat. Off. . |
| 55-80427 | 6/1980 | Japan . |

OTHER PUBLICATIONS

Persico, et al., "Synthesis of Perfluoropolyethers via Hydrocarbon Polyesters: A New General Method," *J. Am. Chem. Soc.*, 107:1197–1201 (1985).

Persico, et al., "A General Synthesis for Symmetrical Highly Branched Perfluoro Ethers: A New Class of Oxygen Carriers," *J. Org. Chem.*, 50:5156–5159 (1985).

Hill et al., "Anionic Polymerization of Fluorocarbon Epoxides" *Am. Chem. Soc. Polymer Preprints*, 18:100 (1977).

*Kirk–Othmer Encyclopedia of Chemical Technology*, pp. 956–959 (1993).

*Primary Examiner*—Frederick Krass
*Attorney, Agent, or Firm*—Hamilton, Brook, Smith & Reynolds

[57] ABSTRACT

This invention pertains to perfluoropolyethers and perhalogenated chlorofluoropolyethers that can be prepared by fluorinating addition polymers made by polymerizing epoxides.

25 Claims, No Drawings

PERFLUORINATED POLYETHERS

RELATED APPLICATION

This application is a continuation-in-part of application Ser. No. 08/125,535 filed Sep. 22, 1993, now abandoned, which is a continuation of Ser. No. 07/982,030, filed Nov. 24, 1992, now abandoned, which is a File Wrapper Continuation of Ser. No. 07/789,420, filed on Nov. 4, 1991, now abandoned, which is a File Wrapper Continuation of Ser. No. 07/414,134, filed on Sep. 28, 1989, now abandoned, which is a continuation-in-part of Ser. No. 07/251,135, filed Sep. 28, 1988, now abandoned.

BACKGROUND

Perfluoropolyethers are highly regarded in the specialty lubricant field because of their wide liquid ranges, low vapor pressures and high thermal and oxidative stabilities. Because of these properties (many of which are unique to fluorocarbons), they are excellent high performance lubricants, superior base stocks for greases, excellent lubricating oils, and heat transfer fluids. In addition, because of these uniquely outstanding properties, saturated perfluoropolyethers are of current interest as specialty sealants, elastomers and plastics.

A reported reaction of saturated perfluoropolyethers is chain cleavage at the ether linkage by aluminum chloride at elevated temperatures to produce acyl chloride and trichloromethyl terminated polymer fragments. (See Tiers, G.V.D., (1955) *J. Amer. Chem. Soc.* 77:4837, 6703).

In spite of their unlimited potential, only three perfluoropolyethers are commercially available to date. They are:

(1) Du Pont's Krytox™ fluid which is made by polymerizing hexafluoropropylene oxide.

(2) Demnum™ fluid, a product of Daikin Industries, is obtained by ring opening polymerization of 2,2,3,3-tetrafluorooxetane using a catalyst with subsequent treatment of the highly fluorinated polyether with fluorine gas to give a perfluorinated product (European Patent Application 148, 482).

(3) Montedison's Fomblin Z™ and Fomblin Y™ fluids which are prepared by photooxidizing tetrafluoroethylene and hexafluoropropylene oxide, respectively, in the presence of oxygen.

Several fluorinated polyethers have been previously prepared. See U.S. Pat. No. 3,125,599, and U.S. Pat. No. 3,250,806.

A process has been described for preparing perfluoropolyethers by reaction of a hydrocarbon polyether with elemental fluorine in the presence of a hydrogen fluoride scavenger. See U.S. Pat. No. 4,755,567.

SUMMARY OF THE INVENTION

This invention pertains to perfluoropolyethers and perhalogenated chlorofluoropolyethers that can be prepared by fluorinating addition polymers made by polymerizing epoxides. More particularly this invention pertains to perhalogenated polyethers having the general formula:

$$X O [Y-O]_n [Y'-O]_m Z \quad \text{I}$$

wherein Y and Y' are the same or different and are selected from the group consisting of

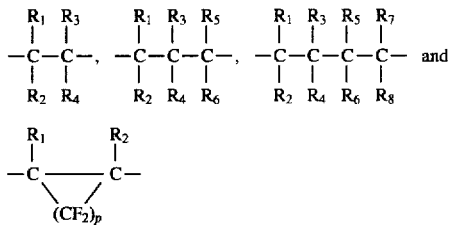

wherein p is an integer between 1 and 50;
wherein $R_1$, $R_2$, $R_3$, $R_4$, $R_5$, $R_6$, $R_7$ and $R_8$, either separately or together are F, Cl, a perfluoroalkyl of one to 20 carbons or a perfluoroalkyl ether of two to 20 carbons wherein one or more fluorine atoms may be substituted by a halogen atom other than fluorine; wherein $R_2$ and $R_8$ when taken together can be $-CR_9R_{10}CR_{11}R_{12}-$, wherein $R_9$ through $R_{12}$ have the values of $R_1$ through $R_8$; wherein X and Z are the same or different and are selected from the group consisting of $-(CF_2)_rOCF_3$, $-(CF_2)_rCOF$, $-(CF_2)_r$ COOH, $-(CF_2)_rC(O)OCH_3$, $-(CF_2)_rCONH_2$ wherein r is an integer from 1 to 12, perfluoroalkyl, perfluoroether and perfluoropolyether; wherein one or more of the fluorine atoms may be substituted by a halogen atom other than fluorine; wherein m is an integer from 0 to 10,000; n is an integer from 1 to 10,000; provided that when m is zero, Y is $-CF_2CF_2-$, n is greater than 20, and Z is $-CF_2COOH$ or $-CF_2COF$, then X cannot be $-CF_2COF$, $-CF_2COOH$, $-CF_2CF_2OF$, $-CF_2CF_2COOH$, $-CF_3$ or $-C_3F_7$; when m is zero, Y is $-CF_2CF_2-$, n is greater than 50 and Z is $-CF_2COOH$ or $-CF_2COF$, then X cannot be $-C_2F_5$; when Y and Y' both have the formula:

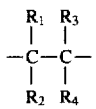

then $R_1$, $R_2$, $R_3$ and $R_4$ together cannot be fluorine if $R_5$ and $R_6$ are selected from a group consisting of F and Cl; and when m is zero and Y is $-CF_2CF_2(CF_3)-$ then $(YO)_n$ cannot be isotactic; and when m is zero, when n is less than 200; and Y is The perfluorinated products of the invention may contain halogens other than fluorine, particularly chlorine, so long as the product is still perfluorinated per se.

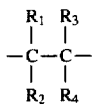

then $R_1$, $R_2$, $R_3$ and $R_4$ together cannot be F.

The perfluorinated products of the invention may contain halogens other than fluorine, particularly chlorine, so long as the product is still perfluorinated per se.

The perfluoropolyethers and perhalogenated chlorofluoropolyethers of this invention can be used as heat transfer fluids, vapor phase soldering fluids, hydraulic fluids, base stocks for greases, lubricants, thermal shock fluids, and in numerous other applications in which an inert, nonflammable, oxidatively stable fluid is required. Monofunctional polymers of the present invention can further be used for surface treatments and as surfactants. Difunctional polymers can be useful as intermediates for preparing elastomers, sealants and protective coatings. Further, the lubricity of the polyethers can be enhanced by increasing the number of chlorine substituents on the chain. As such, the chlorinated compounds of the present invention are particularly useful as hydraulic and thermal shock fluids.

DESCRIPTION OF THE INVENTION

This invention pertains to perhalogenated polyethers of the general formula:

$$XO[Y-O]_n[Y'-O]_mZ \qquad I$$

where Y and Y' are the same or different and are selected from the group consisting of

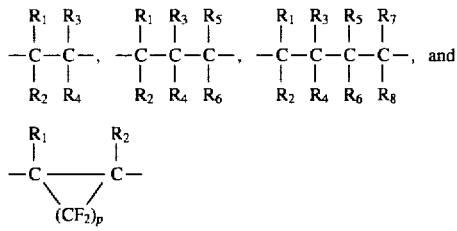

$R_1$, $R_2$, $R_3$, $R_4$, $R_5$, $R_6$, $R_7$ and $R_8$, either separately or together, are F, Cl, a perfluoroalkyl of one to 20 carbons, preferably 1 to 10 carbon atoms, or a perfluoroalkyl ether of two to 20 carbons, preferably 2 to 10 carbon atoms. In $R_1$ through $R_8$, one or more fluorine atoms may be substituted by a halogen atom other than fluorine (preferably chlorine). $R_2$ and $R_8$ when taken together can be —$CR_9R_{10}CR_{11}R_{12}$— wherein $R_9$ through $R_{12}$ may be any of the groups given for $R_1$ through $R_8$. X and Z are the same or different and represent the terminal groups of the oligomer or polymer and may be fluorinated alkyls such as —$CF_3$, —$C_2F_5$, —$C_3F_7$, —$C_4F_9$ groups or they may be functional groups such as —$(CF_2)_rCOF$, —$(CF_2)_rCOOH$, —$(CF_2)_rOCF_3$, —$(CF_2)_rCONH_2$, —$(CF_2)_rC(O)OCH_3$ wherein r is an integer from 1 to 12. X and Z may also be simple derivatives of the functional groups listed above such as methylols, acid chlorides, amides, amidines, acrylates and esters, such as —$CF_2C(O)OR'$, —$CF_2CF_2C(O)OR'$, —$CF_2CF(CF_3)C(O)OR'$, —$CF(CF_3)CF_2C(O)OR'$, —$CF_2CF_2CF_2C(O)OR'$, and —$CF_2CONH_2$; wherein R' is a hydrocarbon or fluorocarbon which contains one to ten carbon atoms and which may contain one or more ether oxygens and/or chlorine substituents. m is an integer from 0 to 10,000; n is an integer from 1 to 10,000 and p is an integer from 1 to 50 with a preferred range of 3 to 5, except that the provisos below apply.

The n and m subscripts in Formula I are average indices of composition such that when m is zero the polyether is referred to as an isotactic or atactic homopolymer being composed of the repeating unit (YO); when m and n are both greater than zero the polyether is referred to as either a random copolymer, alternating copolymer or block copolymer of (YO) and (Y'O) repeating units.

When m is zero and n is an integer greater than 50, Y is —$CF_2CF_2$—, and Z is —$CF_2COOH$, —$CF_2COF$, —$CF_2C(O)OCH_3$ or —$CF_2C(O)NH_2$, then X cannot be —$C_2F_5$.

When m is zero, n is greater than 20, Y is —$CF_2CF_2$— and Z is —$CF_2COOH$ or —$CF_2COF$, then X cannot be —$CF_2COOH$, —$CF_2COF$, —$CF_2CF_2COOH$, —$CF_2CF_2COF$, —$CF_3$ or —$C_3F_7$.

When m is zero and Y is —$CF_2CF(CF_3)$—, then $(YO)_n$ cannot be an isotactic polymer.

Another embodiment can include a perfluorinated polyether having an average formula:

$$XO(Y-O)_n(Y'-O)_mZ$$

wherein Y is

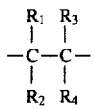

and Y' is selected from the group consisting of

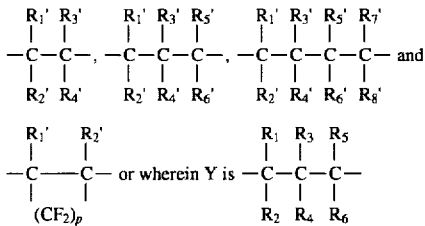

and Y' is selected from the group consisting of

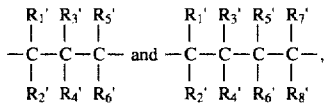

wherein p is an integer from 1 to 50; wherein $R_1$, $R_2$, $R_3$, $R_4$, $R_5$, $R_6$, $R_1'$, $R_2'$, $R_3'$, $R_4'$, $R_5'$, $R_6'$, $R_7'$ and $R_8'$, either separately or together, are F, perfluoroalkyl of one to twenty carbons or a perfluoroalkyl ether of two to twenty carbons; wherein $R_2'$ and $R_8'$ when, taken together, can be —$CR_9R_{10}CR_{11}R_{12}$—, wherein $R_9$ through $R_{12}$ are the same or different and are selected from the groups given for $R_1'$ to $R_8'$; wherein X and Z are the same or different and are selected from the group consisting of perfluoroalkyls, perfluoroethers, perfluoropolyethers, fluoroalkyls terminated with fluoroacyl, carboxyl, amide or ester; methylols, acid chlorides, amides, amidines, acrylates and esters; wherein m is an integer from 0 to 10,000; and n is an integer from 5 to 10,000 with the proviso that each ether repeating unit contains at least one perfluoroalkyl or perfluoroalkyl ether of two to twenty carbon atoms and provided that the polyether does not consist essentially of

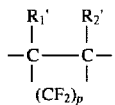

The perfluorinated polyether can have X and Z which are fluorinated alkyls selected from the group consisting of —$CF_3$, —$C_2F_5$, —$C_3F_7$ and —$C_4F_9$. X and Z can also be functional end groups selected from the group consisting of —$(CF_2)_rCOF$, —$(CF_2)_rCOOH$, —$(CF_2)_rOCF_3$, —$(CF_2)_rCONH_2$, and —$(CF_2)_rC(O)OCH_3$, wherein r is an integer from 1 to 12. Further, X and Z can be functional groups derivatives selected from the group consisting of methylols, acid chlorides, amides, amidines, acrylates and esters. In one embodiment, the esters are selected from a group consisting of —$CF_2CF_2C(O)OR'$, —$CF_2CF(CF_3)C(O)OR'$, —$CF(CF_3)CF_2C(O)OR'$, and —$CF_2CF_2CF_2C(O)OR'$, wherein R' is a hydrocarbon or fluorocarbon which contains one to ten carbon atoms and which may contain one or more ether oxygens and/or chlorine substituents.

The perfluorinated polyether can have repeating units wherein n is an integer in the range of from 10 to 10,000. In another embodiment, n is an integer in the range of from 15 to 10,000. In still another embodiment, n is an integer in the range of from 25 to 10,000. Also, m can be is an integer in the range of from about 1 to 100.

In another embodiment, the perfluorinated polyether can have a linear chain structure consisting essentially of a total of at least five repeating units, which includes —YO— and —Y'O—, wherein Y is $CR_1R_2CR_3R_4$ and Y' is selected from $CR_1'R_2'CR_3'R_4'$, $CR_1'R_2'CR_3'R_4'CR_5'R_6'$, and $CR_1'R_2'CR_3'R_4'CR_5'R_6'CR_7'R_8'$, wherein $R_1$, $R_2$, $R_3$, $R_4$, $R_1'$, $R_2'$, $R_3'$, $R_4'$, $R_5'$, $R_6'$, $R_7'$ and $R_8'$ in each repeating unit comprises F, perfluoroalkyl of one to twenty carbons or a perfluoroalkyl ether of two to twenty carbons. Alternatively, the number of repeating units can be at least ten, fifteen, twenty-five or fifty.

In a further embodiment, the perfluorinated polyether can have a linear chain structure consisting essentially of a total of at least five repeating units —YO— and —Y'O—, wherein Y is $CR_1R_2CR_3R_4CR_5R_6$ and Y' is selected from —$CR_1'R_2'CR_3'R_4'CR_5'R_6'$— and —$CR_1'R_2'CR_3'R_4'CR_5'R_6'CR_7'R_8'$—, wherein $R_1$, $R_2$, $R_3$, $R_4$, $R_5$, $R_6$, $R_1'$, $R_2'$, $R_3'$, $R_4'$, $R_5'$, $R_6'$, $R_7'$ and $R_8'$, in each repeating unit comprises F, perfluoroalkyl of one to twenty carbons or perfluoroalkyl ether of two to twenty carbons. Alternatively, the number of repeating units can be at least ten, fifteen, twenty-five or fifty.

In yet another embodiment, perhalogenated polyethers can be prepared by fluorinating addition polymers made by polymerizing 1,2-epoxides, 1,3-epoxides and higher epoxides. The polymers prepared from a polymerized 1,2-epoxide would have essentially the following formula:

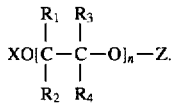
II

The simplest member of this series, perfluoro-poly(ethylene oxide), prepared by fluorinating the polymer resulting from the polymerization of ethylene oxide. Nonelastomeric perfluoropoly(ethylene oxide) is the subject of several U.S. Pats. (See e.g., U.S. Pat. No. 4,760,198). Perfluoropoly(ethylene oxide) polymers of this invention are elastomeric and have ethylene oxide repeat units (i.e., when $R_1$, $R_2$, $R_3$ and $R_4$ are all F, then n is 200 or more. A preferred compound of Formula II which is an elastomeric perfluorinated polyether, will have 200 to 10,000 repeating tetrafluoroethylene oxide units. The elastomers will have a molecular weight of approximately 20,000 a.m.u. or above.

Similarly, a perhalogenated polymer made from a polymerized 1,3-epoxide would have essentially the following formula:

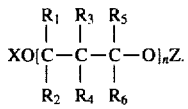
III

In each formula (II and III), $R_1$, $R_2$, $R_3$, $R_4$, $R_5$, and $R_6$ may be the same or different and may be selected from the group consisting of —Cl, —F, —$CF_3$, —$CF_2Cl$, —$C_2F_5$, —$C_3F_7$, —$C_4F_9$, —$OCF_3$, —$OC_2F_5$, and perfluoroalkyl of one to 20 carbons (preferably 1 to 10 carbons), or a perfluoroalkyl ether of two to 20 carbons (preferably 2 to 10 carbons) wherein one or more of the fluorine atoms may be substituted by a halogen atom other than fluorine; wherein $R_1$, $R_2$, $R_3$ and $R_4$ together are not fluorine if $R_5$ and $R_6$ are selected from a group consisting of F and Cl. X and Z and n are as defined above.

In another embodiment perfluoropolyethers and perhalogenated chlorofluoroethers of the formula:

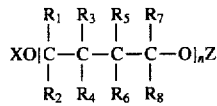
IV and $R_1$, $R_2$, $R_3$, $R_4$, $R_5$, $R_6$, $R_7$ and $R_8$, either separately or together are F, Cl, a perfluoroalkyl of one to 20 carbons (preferably 1 to 10 carbons), or a perfluoroalkyl ether of 2 to 20 carbons (preferably 2 to 10 carbons) wherein one or more fluorine atoms may be substituted by a halogen atom other than fluorine; where X, Z and n are defined above. Preferably, n is an integer from 200 to 10,000.

Examples of perfluoropolyethers where m is zero and X, Z, n and R' are defined above have the following compositions:

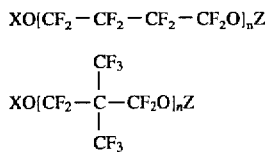

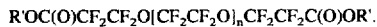
R'OC(O)CF_2CF_2O[CF_2CF_2O]_nCF_2CF_2C(O)OR'.

Examples of perfluoropolyethers where m is zero and X, Z and n are defined above, are shown below. Polymers of this type may be isotactic or atactic homopolymers.

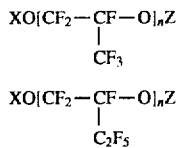

Examples of perhalogenated polyethers where m and n are greater than zero and X and Z are defined above having the following compositions:

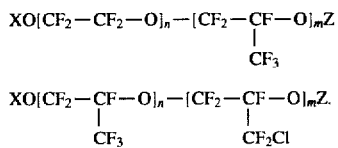

Perfluoropolyethers and perhalogenated chlorofluoroethers can also be made having the formula:

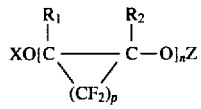
V wherein X, Z, $R_1$, $R_2$, n and p are as previously defined. Preferably, p is an integer from 3 to 5.

In yet another embodiment, perfluoropolyethers can be made having the formula:

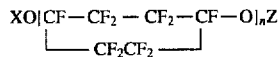
VI wherein X and Z are selected from the group consisting of —$CF_3$, —$C_2F_5$, —$C_3F_7$, —$C_6F_{13}$, COF, —$CF_2OCF_3$, —$CF_2COF$, —COOH, and $CF_2COOH$, and wherein n is an integer from 1 to 10,000.

This invention further pertains to a method of making perhalogenated compounds, such as perfluoropolyethers and perhalogenated chlorofluoropolyether polymers.

Two basic types of polymers can be prepared from alkylene oxides. The first involves the reaction of the epoxide with compounds having one or more labile hydogens such as water, phenol, alcohols, acids, etc. The products obtained, generally speaking, have from 2 to 100 alkylene oxide units. The second type of polymer is characterized by a much higher molecular weight often exceeding 1,000,000. The polymers are prepared by treating the epoxide with Lewis acids, bases, as well as numerous other catalysts.

The hydrocarbon polyethers are best converted to fluorocarbons using fluorine gas which is commercially available at sufficiently high purity levels and at an acceptable cost. The fluorination reaction is generally carried out at a temperature from $-40°$ to $+150°$ C., preferably from $-10°$ and $+50°$ C. It can be carried out in a reactor containing an ultraviolet light source or in the dark. Using the preferred temperature range, it is not necessary to have an ultraviolet light source since the fluorine is sufficiently reactive. If an ultraviolet light source is used, a wavelength between 250 and 350 nm is preferred. When the reactor is radiated with an external light source, a transparent window is needed which does not react with either fluorine or hydrogen fluoride. A quartz lens coated with a thin film of fluorinated ethylene-propylene copolymer works well.

The fluorination reaction can be carried out in a variety of ways. The polyether can be coated on a sodium fluoride powder to give a free-flowing powder which can be fluorinated in either a stationary tube, in a rotating drum-type reactor, or in a fluidizing bed. See U.S. Pat. No. 4,755,567.

Alternatively, the polyether can be fluorinated in a liquid phase fluorination reactor. See U.S. patent application Ser. No. 07/250,376, entitled "Liquid Phase Fluorination", filed Sep. 28, 1988, now abandoned, U.S. Pat. No. 5,093,432, issued to Bierschenk et al. (Mar. 3, 1992) the teachings of each are incorporated by reference herein. A typical laboratory-size reactor for example, has a volume of about 10 liters and contains approximately 2 to 8 liters of a suitable fluorine-inert liquid. Perhalogenated chlorofluorocarbons are typically used as the fluorine-inert fluorination medium. However, perfluorocarbons, such as Fluorinert™ FC75 (3M Corporation, St. Paul, Minn.; mixture of perfluoro(2-n-butyltetrahydrofuran and perfluoro(2-n-propyltetrahydropyran) and perhalogenated chlorofluoropolyethers can also be used as the liquid phase fluorination medium. 1,1,2-trichlorotrifluoroethane (Freon™ 113) works well providing the reactor is operating at a temperature above the melting point of the material and below the temperature at which the fluorine reacts with it (typically 50° C.). Other fluorinated solvents can be used such as perfluoroamine, perfluoroalkanes, low molecular weight perfluoropolyethers, etc.

Fluorination can be carried out in a batch mode where the hydrocarbon precusor which is to be fluorinated is dissolved in the fluorination liquid and fluorine gas is bubbled through the liquid medium. However, superior results are obtained for most materials if the hydrocarbon polyether is metered into the reactor at a controlled rate for the duration of the reaction. When practicing the method in this manner, the reactor is charged with the liquid fluorination medium, placed in a constant temperature bath and purged with an inert gas, such as nitrogen gas. If 1,1,2-trichlorotrifluoroethane is used as the liquid medium, a condenser is placed downstream from the reactor and is maintained at $-35°$ C.

The hydrocarbon polyether may be fed into the reactor neat, if it has a sufficiently low viscosity, or it may be diluted with a suitable solvent. If the fluorination is being carried out in 1,1,2-trichlorotrifluoroethane, the organic feed can be conveniently diluted with the same solvent. If the hydrocarbon is insoluble in the fluorination medium, it can usually be fluorinated as an emulsion or suspension in the liquid fluorination medium. For example, a polyether such as a 2000 MW polyethylene glycol can be dissolved in an equal volume of 1,1,2-trichlorotrifluoroethane if a small amount of chloroform is added (10 to 20 volume percent). The diluted polymer solution when fed into a fluorination reactor containing 1,1,2-trichlorotrifluoroethane forms an emulsion which can be conveniently fluorinated. Other solvents with high solvating power for polyethers which consume little if any fluorine include trichloroethane, trifluoroacetic acid, trifluoroacetic anhydride, etc.

During a typical reaction, the polyether is fed into the reactor at a rate of 10 to 60 grams per hour. Fluorine gas is delivered to the vigorously stirred reactor at a rate sufficient to react with all of the organic feed plus an additional 5 to 10 percent. Typically the fluorine gas is diluted with an inert gas such as nitrogen. This is of particular importance if a liquid fluorination medium such as 1,1,2-trichlorotrifluoroethane is used. It is imperative to keep the fluorine concentration low so that the liquid fluorination medium and fluorine in the vapor space do not form a flammable mixture. The flammability limits of various solvents in fluorine gas can be determined by spark testing. In a typical reaction, a fluorine concentration of 10 to 40% works well. If operating properly, the fluorine concentration in the exit gas will be between 2 and 4%.

The continuous addition reactor may be operated in a batch or continuous mode. If operating continuously, a small portion of the reactor contents is removed continuously or periodically. The product is recovered by distillation and the fluorination liquid is returned to the reactor.

When carrying out a liquid phase reaction, a hydrogen fluoride scavenger such as sodium fluoride or potassium fluoride may or may not be present in the solution to scavenge the by-product hydrogen fluoride. However, the preferred mode for carrying out the reaction for many polyethers is with a sufficient quantity of a hydrogen fluoride scavenger being present to complex with all of the hydrogen fluoride formed. When fluorinating ethers in the presence of sodium fluoride, improved yields are obtained while chain cleavage and rearrangements are minimized. See U.S. Pat. Nos. 4,755,567 and 4,859,747, the teachings of each are incorporated herein by reference.

Polyethers containing sterically hindered oxygens and/or chlorine in the vicinity of the oxygen can be fluorinated in high yield without having a hydrogen fluoride scavenger present. Naturally, these reactions are more amenable to continuous processes than those reactions requiring a hydrogen fluoride scavenger.

The polymers prepared according to the method of the invention range in molecular weight from about 300 to 1,000,000 a.m.u. in size. Generally speaking, products having an average molecular weight below 10,000 a.m.u. are liquids while those having a molecular weight above 10,000 are solids.

The perhalogenated, compounds of the present invention have distinct advantages over the materials prepared by the prior art. High molecular weight polymers can be prepared thereby making it possible to make elastomers directly. Due to the versatility of the process, a wide variety of structures can be prepared giving fluids and elastomers with greatly varying physical properties. For example, compounds of the present invention which are useful as hydraulic fluids will have a molecular weight range of from about 200 to about 2,000 a.m.u. and a preferred molecular weight range of from about 500 to about 1500 a.m.u. Compounds which are suitable as lubricants will have a molecular weight range of from about 500 to about 15,000 a.m.u. and a preferred range of from about 1000 to about 6000 a.m.u. At this range, the polyethers are typically oils. They can be used as base oils in lubricant compositions and can be admixed with optional additives and fillers to enhance the performance of the lubricant composition. Particularly suitable base oils are perhalogenated chlorofluoropolyethers, such as perfluoropolyepichlorohydrin having a molecular weight of from about 500 to about 5000 a.m.u. (See U.S. Pat. No. 4,931,199 the teachings of which are incorporated by reference.)

Perhalogenated polyethers of this invention which can be useful as lubricants or hydraulic fluids will have inert terminal groups, such as perfluoroalkyl groups. The terminal groups are determined by the repeat unit. For example, a polymer comprising essentially tetraethylene oxide repeat units can have terminal groups of —$CF_3$ or —$C_2F_5$.

A high molecular weight perfluoropoly(ethylene oxide) elastomeric solid can be prepared by fluorinating a poly(ethylene glycol) polymer having a molecular weight of approximately 20,000 a.m.u. In contrast, polymers made by polymerization of tetrafluoroethylene oxide are generally either fluids or low melting waxes. Furthermore, the polymerization of tetrafluoroethylene oxide is quite hazardous and has on several occasions resulted in unexplained explosions.

Not only can one prepare useful fluids and elastomers by the method of this invention, it is also possible to prepare excellent yields of valuable fluids which can be used in the electronics industry. For example, the fluorination of heptaglyme can be carried out with a yield in excess of 50% to give perfluoroheptaglyme—a potentially useful vapor phase soldering fluid (b.p. 205° C.). The compounds of this invention which are useful as vapor phase soldering fluids will have boiling points sufficiently high to melt the solder, a molecular weight range of from about 400 to 1,500 a.m.u. and a preferred molecular weight range of from about 600 to about 1000.

In addition to the inert polymers just described, it is also possible to prepare monofunctional and difunctional oligomers and polymers by the present art. Typically, a polymer containing hydroxyl terminal groups is treated with acetyl chloride to give a polyether diester. Fluorination of the polymer gives a perfluoropolyether with essentially complete retention of the functionality. The perfluoropolyether diester is typically transesterified with methanol to give the hydrolyrically more stable methyl ester which can be converted to an amide, alcohol free acid, etc. by carrying out a few simple transformations.

The monofunctional polymers prepared in this manner may find uses as surfactants and surface treatments while the difunctional polymer should make valuable intermediates for preparing elastomers, sealants and protective coatings.

Because of the unique versatility of this approach, it is possible to prepare perfluoropolyether polymers having a variety of terminal groups. For example, treatment of a hydroxyl terminated polymer prior to fluorination with thionyl chloride gives a $CF_2Cl$ terminated polymer. Reaction of a diol with acrylonitrile in the presence of base followed by acid catalyzed alcoholysis gives —$OCH_2CH_2C(O)OR$ terminal groups. Fluorination of the polymer followed by transesterification with methanol gives a polymer containing —$OCF_2CF_2C(O)OCH_3$ terminal groups. Unlike the difunctional fluids prepared by oligomerization of tetrafluoroethylene oxide, the above difunctional fluid can be subjected to a Hunsdeicker reaction to give stable iodine-terminated prepolymers.

In a similar reaction, a polyether terminated with hydroxyl groups can be treated with methacrylonitrile in the presence of a base to give a polymer which upon acid catalyzed alcoholysis gives a —$OCH_2CH(CH_3)C(O)OR$ terminated polymer. Fluorination of the polymer followed by treatment with methanol gives a polymer containing —$OCF_2CF(CF_3)C(O)OCH_3$ terminal groups. Derivatives prepared from fluids of the above structure are expected to exhibit superior physical properties due to the presence of the pendant trifluoromethyl group adjacent to the functional group. Perfluoroalkyl pendant groups are known to sterically protect functional groups from attack by nucleophiles.

The fluorination of poly(propylene glycol) further demonstrates the versatility of the present invention. If an isotactic polymer is fluorinated, a polymer is prepared with a structure essentially identical to that of the fluid prepared by polymerization of hexafluoropropylene oxide. One can also prepare an atactic perfluoropolypropylene oxide. Propylene oxide typically polymerizes in a random fashion with head-to-head, head-to-tail and tail-to-tail addition occuring. Atactic perfluoropoly(propylene oxide) has slightly improved low temperature properties than the isotactic polymer.

Polymers having properties intermediate between perfluoropoly(ethylene oxide) and perfluoropoly(propylene oxide) can be prepared by fluorinating copolymers of ethylene oxide and propylene oxide. The hydrocarbon polyethers can be prepared with a wide variety of ethylene oxide and propylene oxide ratios. The copolymers can be both random copolymers or block copolymers.

In contrast with the perfluoropolyethers just described which typically have very low pour points or low glass transition temperatures, extremely viscous products are obtained when polyethers, such as poly(1,2-epoxyhexane), having bulky pendant groups are fluorinated. However, polymers such as these often exhibit improved oxidative stability and improved compatibility with metals at elevated temperatures.

Fluorinated telomers of epichlorohydrin and 3,3-bis(chloromethyl)oxetane can be prepared by the method of this invention. These fluids contain a significant amount of chlorine placed on primary carbons. The oxidative stability and oxidation-corrosion behavior of these materials are similar to that of perfluoropolyethers which do not contain chlorine. The chlorine increases the lubricity of the fluid and significantly increases the bulk modulus of the material making these fluids promising nonflammable hydraulic fluid candidates. In contrast, other nonflammable hydraulic fluids presently being considered such as those based on telomers of chlorotrifluoroethylene are much less stable owing to the wide variety of chlorinated structures within the fluid. Many of these structures have limited high temperature stability. The amount of chlorine substitution on the primary carbons depends upon what the perhalogenated compound will be used for. For example, hydraulic fluids will typically contain from about 20 to about 40% chlorine atoms.

The following examples will further illustrate the invention, but are not to be construed as limiting its scope.

EXAMPLE 1

A 10 liter stirred tank reactor was loaded with 5.4 liters of 1,1,2-trichlorotrifluoroethane and 1415 g of finely ground sodium fluoride powder. The reactor was positioned in a constant temperature bath which maintained a reactor temperature of −7° C. A condenser, which was placed downstream from the reactor, was used to condense and return to the reactor any liquid vapor which may be in the gas exit line. The condenser was maintained at −35° C. A mixture consisting of 328 g of a poly(ethylene glycol) diacetate having an average molecular weight of 600, 320 g of 1,1,2-trichlorotrifluoroethane and 113 g of chloroform (used to solubilize the polyether in the 1,1,2-trichlorotrifluoroethane) was slowly metered into the fluorination reactor over a 26 hour period. Fluorine gas, diluted with nitrogen to give a concentration of 20%, was bubbled through the vigorously stirred fluorination liquid at a rate 10 to 15% higher than that required to theoretically replace all of the hydrogen on the hydrocarbon being pumped into the reactor. Following the reaction, the reactor was purged with several volumes of nitrogen to remove the unreacted fluorine gas. Next, 154 g methanol was pumped into the reactor. The reactor warmed slightly as the perfluorodiester reacted with the methanol to give the hydrolytically more stable dimethyl ester. The product was filtered to remove the sodium fluoride and sodium bifluoride solids. The product (M.W. 1500), which was obtained in about 80% yield was separated from the 1,1,2-trichlorotrifluoroethane and methanol by distillation.

$^{19}$F NMR of the product in chlorotrifluoromethane gave a small-triplet at −77.7 ppm (rs. CFCl$_3$) and a large singlet at −88.7 ppm corresponding to the terminal and interior difluoromethylene of perfluoropoly(ethylene glycol), respectively.

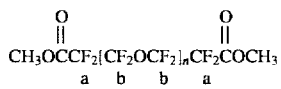

No definitive peak corresponding to a monofunctional or nonfunctional compound could be seen in the $^{19}$F NMR.

EXAMPLE 2

A 252 g sample of poly(ethylene glycol) having an average molecular weight of 1000 was mixed with 400 g of 1,1,2-trichlorotrifluoroethane and 188 g of trifluoroacetic acid to give a homogeneous solution which was slowly pumped into a 10 liter fluorination reactor containing 5.7 liters of 1,1,2-trichlorotrifluoroethane and 1150 g of sodium fluoride powder. The reactor was maintained at 10° C. as 20% fluorine was delivered at a rate sufficient to react with all of the organic being fed into the reactor. The reaction was complete in approximately 26 hours. Filtration of the product, followed by removal of the fluorination liquid gave 535 g of perfluoropoly(ethylene oxide). Treatment of the fluid for several hours at 250° C. with 30% fluorine converted the reactive terminal groups to perfluoroalkyl groups. The fluid was distilled into fractions having the following physical properties:

| Property | | Fraction | | |
|---|---|---|---|---|
| | | 1 | 2 | 3 |
| Boiling point range °C. (mm Hg) | | <200(100) | >200(100) <245(10) | >245(10) <288(0.05) |
| % of total | | 13 | 40 | 36 |
| Kinematic Viscosity (cst.) | 20° C. | 3.32 | 13.2 | 33.9 |
| | 40° C. | 2.07 | 7.21 | 16.1 |
| | 60° C. | 1.43 | 4.25 | 9.05 |
| | 80° C. | 1.05 | 2.80 | 5.73 |
| | 95° C. | 0.85 | 2.09 | 4.19 |
| | 149° C. | 0.46 | 1.07 | 1.93 |
| ASTM slope | | 0.934 | 0.725 | 0.681 |
| Density (20° C., g/ml) | | 1.7484 | 1.7650 | 1.7883 |

| Property | | Fraction | |
|---|---|---|---|
| | | 4 | 5 |
| Boiling point range °C. (mm Hg) | | >288(0.05) <343(0.05) | >343(0.05) |
| of total | | 7 | 4 |
| Kinematic Viscosity (cst.) | 20° C. | 127.00 | 447.00 |
| | 40° C. | 51.9 | 173.00 |
| | 60° C. | 26.7 | 82.9 |
| | 80° C. | 15.5 | 44.9 |
| | 95° C. | 11.1 | — |
| | 149° C. | 4.27 | 11.4 |
| ASTM slope | | 0.538 | 0.488 |
| Density (20° C., g/ml) | | 1.8133 | 1.8234 |

$^{19}$F NMR of fraction #4 in CFCl$_3$ gave the following results:

(δ ppm vs CFCl$_3$)

−56.0 (t, 9.6 Hz, a); −89.0 (s,c) and −91.0 (q, 9.6 Hz, b)

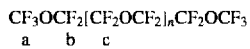

Anal. Calcd. for C$_2$F$_4$O: C, 20.69; F, 65.17.
Found: C, 20.77; F, 65.29

EXAMPLE 3

In an experiment similar to Example 2, 252 g of a poly(ethylene glycol) having an average molecular weight of 1540 was diluted with 500 ml 1,1,2,-trichlorotrifluoroethane, 87 g trifluoroacetic anhydride and 74 g of trifluoroacetic acid. The homogeneous solution was pumped over a 28 hour period into a 10° C. fluorination reactor containing 5.7 liters of 1,1,2-trichlorotrifluoroethane and 1150 g of sodium fluoride powder. Following filtration and distillation of the product, 398 g of a perfluorinated fluid was recovered (60% yield) along with a small amount of elastomeric solids. The fluid had a composition identical to the fluid described in the previous example and a molecular weight of 2500 a.m.u.

EXAMPLE 4

A perfluoropolyether elastomer was prepared by dissolving 146 g of an 18,500 a.m.u poly(ethylene glycol) in 354 g of chloroform containing 564 g of 1,1,2-trichlorotrifluoroethane. The viscous solution was slowly pumped into a 10° C. reactor containing 5 liters of 1,1,2-trichlorotrifluoroethane and 800 g of sodium fluoride. Twenty percent fluorine, diluted with nitrogen, was metered into the reactor throughout the reaction which lasted approximately 28 hours. Following the reaction, the product was filtered to give a clear filtrate which contained 14.5 g of a polymeric fluid (3.8%). The insoluble portion of the product consisted of sodium fluoride, sodium bifluoride and perfluoropoly(ethylene oxide) solids (81% yield) having the following structure:

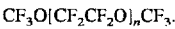

The solids were pressed into thin elastomeric sheets using a laboratory-size mill. The polymer remained elastic over a temperature range of −80° C. to +360° C.

EXAMPLE 5

Five hundred grams of poly(tetramethylene ether) glycol having an average molecular weight of 1000 was treated with a 50% molar excess of acetyl chloride to convert the hydroxyl end groups of the polymer to acetate groups. The acetylated polymer (288 g) was mixed with 500 ml 1,1,2-trichlorotrifluoroethane and was slowly pumped into a 10 liter reactor containing 5 liters of 1,1,2-trichlorotrifluoroethane and 1400 g of sodium fluoride powder. The reactor temperature was maintained at 5° C. while 20% fluorine was metered into the reactor at a rate sufficient to react with the organic being delivered. Following the reaction, the product was filtered to remove the sodium fluoride and the filtrate was concentrated to give 700 g of a fluorinated oil (81% yield) which was treated for 12 hours at 270° C. with 30% fluorine to remove any remaining hydrogens and to convert the terminal esters to nonreactive perfluoroalkyl groups. Approximately 40% of the oil distilled between 200° and 300° C. at 0.05 mm Hg. The average molecular weight by $^{19}$F NMR end group analysis was 3054. The fluid had a pour point of −50° C.

| Viscosity of Perfluoropoly(tetramethylene ether) glycol | | |
|---|---|---|
| Temperature °C. | Viscosity (cst.) | Slope ASTM #D341 |
| 20 | 164.9 | |
| 80 | 14.61 | −0.654 |
| 150 | 3.29 | |

| $^{19}$F NMR data for Perfluoropoly(tetramethylene ether) glycol | | | |
|---|---|---|---|
| Structure | δ(Multiplicity) ppm vs CFCl$_3$ | J(F—F) Hz | Rel. Inten. % |
| C$\underline{F}_3$O | −55.7 (t) | 18.3 | 0.2 |
| CF$_3$CF$_2$C$\underline{F}_2$O | −81.9 (t) | 7.3 | 4.9 |
| OCF$_2$CF$_2$CF$_2$C$\underline{F}_2$O | −83.3 (s) | | 42.6 |
| CF$_3$CF$_2$C$\underline{F}_2$O | −84.3 (m) | | 3.3 |
| C$\underline{F}_3$CF$_2$O | −87.3 (s) | | 0.8 |
| C$\underline{F}_3$CF$_2$O | −88.5 (p) | | 0.5 |
| OC$\underline{F}_2$CF$_2$CF$_2$CF$_2$O | −125.7 (s) | | 42.6 |
| CF$_3$C$\underline{F}_2$CF$_2$O | −130.0 (s) | | 3.3 |

Anal. Calcd. for CF$_3$CF$_2$CF$_2$O(CF$_2$CF$_2$CF$_2$CF$_2$O)$_{12.5}$–CF$_2$CF$_2$CF$_3$: C, 22.00; F, 70.92. Found: C, 21.87; F, 70.02

EXAMPLE 6

Using the procedures outlined in Example 1, a solution consisting of 280 g of poly(tetramethylene ether) glycol (terminal groups treated with acetyl chloride to give a diester) having an average molecular weight of 2000 and 550 ml of 1,1,2-trichlorotrifluoroethane was slowly metered, over a 32 hour period, into a 5° C. fluorination reactor containing 5 liters of 1,1,2-trichlorotrifluoroethane and 1400 g of sodium fluoride powder. Upon completing the reaction, the reactor was purged with several volumes of nitrogen to remove the unreacted fluorine gas. Methanol (150 g) was added to the reactor. The reactor contents were filtered to give a clear filtrate which upon removal of the 1,1,2-trichlorotrifluoroethane and unreacted methanol via a distillation gave a nearly quantitative yield of perfluoropoly(tetramethylene ether) dimethyl ester (M. W. 4250).

EXAMPLE 7

Into a 500 cc stainless steel pressure vessel were placed 250 g 1,2-epoxybutane and 1 g ferric chloride catalyst. The reactor was rocked in an 80° C. oven for approximately 96 hours during which time the epoxide polymerized to give a high molecular weight semisolid. The polymer was dissolved in 1 liter of 1,1,2-trichlorotrifluoroethane and pumped into a fluorination reactor using the procedures outlined in Example 1. The reactor, which contained 5 liters of 1,1,2-trichlorotrifluoroethane and 1250 g sodium fluoride powder, was held at 0° C. with a constant temperature bath. Following the 22 hour reaction, 750 g of fluid was recovered which was further fluorinated at 300° C. with 30% fluorine for an additional 24 hours to give 660 g of fluid (88% yield). Approximately 220 g of fluid distilled between 200° and 300° C. at reduced pressure (0.05 mm Hg) with approximately equal amounts boiling below and above that range. The average molecular weight of the mid-fraction was 1850 (by $^{19}$F NMR end group analysis). The fluid had a pour point of −9° C.

| Viscosity Of Perfluoropoly(1,2-epoxybutane) bp>200° C. and <300° C. @ 0.05 mm Hg | | |
|---|---|---|
| Temp (°C.) | Viscosity (cst.) | Slope ASTM #D341 |
| 20 | 5688 | |
| 80 | 72.9 | −0.725 |
| 150 | 6.52 | |

| $^{19}$F NMR of Perfluoropoly(1,2-epoxybutane) | | |
|---|---|---|
| Structure | δ(Multiplicity) ppm vs CFCl$_3$ | Rel. Inten. % |
| C$\underline{F}_2$CF(C$_2$F$_5$)O | −77.3, −80.0, 82.2 | 23.3 |
| CF$_2$CF(C$\underline{F}_2$CF$_3$)O | −81.0 (s) | 35.3 |
| C$\underline{F}_3$CF$_2$CF$_2$O | −82.0 (m) | 4.2 |
| C$\underline{F}_3$CF$_2$CF$_2$O | −84.7 (m) | 2.8 |
| CF$_2$CF(CF$_2$C$\underline{F}_3$)O | −120 to 127 | 23.3 |
| CF$_3$C$\underline{F}_2$CF$_2$O | −130.3 | 2.8 |
| CF$_2$C$\underline{F}$(C$_2$F$_5$)O | −141.2 (m) | 7.8 |

EXAMPLE 8

A potentially useful nonflammable hydraulic fluid was prepared by placing in a 3 liter, 3 neck flask equipped with a mechanical stirrer, 80 g 2-chloroethanol (1.0 mol) and 1 ml boron trifluoride-etherate. To this solution, 462 g epichlorohydrin (5.0 mol) was added over a one hour period while the reaction temperature was maintained below 50° C. throughout the addition. The mixture was stirred for an additional 12 hours at ambient temperature resulting in the formation of a very viscous fluid. The product (403 g) was dissolved in 164 g chloroform containing 405 g 1,1,2-trichlorotrifluoroethane. This solution was metered into an 18° C. reactor which contained 5 liters of 1,1,2-trichlorotrifluoroethane. Fluorine gas (20%) was introduced at a rate which was approximately 5% greater than the theoretical amount required to react with all of the hydrogens on the material entering the reactor. Upon completion of the reaction which lasted approximately 20 hours, the reactor was purged with nitrogen to remove the unreacted fluorine gas.

Distillation of the product to remove the fluorination liquid gave 620 g of a perfluorinated fluid having substantially the following structure:

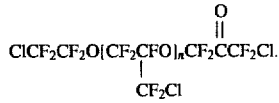

M.W. 848; Density (37.8° C.): 1.7973 g/ml Bulk modulus (37.8° C. and 3000 PSIG): 129700 PSIG Elemental analysis: Calculated for an average structure $C_{2.11}F_{4.42}Cl_{0.8}O(C_3F_5ClO)_{3.05}C_{2.11}F_{4.42}$—$Cl_{0.8}$ C, 18.92; F, 53.98; Cl, 19.44
Found: C, 18.86; F, 51.15; Cl, 18.26%

A further treatment of the above product with 30% fluorine at 225° C. converted the carbonyl to a difluoromethylene group (618 g). Following treatment of the product at elevated temperatures with fluorine the product was distilled. The portion boiling between 50° C. and 150° C. at 2 mm Hg was collected (80% of the sample) and was shown to be a very promising hydraulic fluid candidate. The bulk modulus of the material was measured using an isothermal secant method. The following results were obtained:

| Perfluoropolyepichlorohydrin Type I Bulk Modulus $M_B$ @ PSI | | | | |
|---|---|---|---|---|
| °F. @ PSI | 1000 | 2000 | 3000 | 4000 |
| 100° F. | 129,500 | 136,700 | 138,600 | 145,100 |
| 150° F. | 180,700 | 104,200 | 109,700 | 115,400 |

| Viscosity of Perfluoropolyepichlorohydrin Type 1 Hydraulic Fluid (monochloro end group) | |
|---|---|
| Temp °F. | Viscosity (cst.) |
| −65 | 1198 |
| 100 | 3.5 |
| 176 | 1.42 |

EXAMPLE 9

A high molecular weight perfluoropolyepichlorohydrin fluid, having properties similar to those required for a vacuum pump fluid, was prepared by reacting 50 g 2-chloroethanol (0.63 mol) with 462 g epichlorohydrin (5.0 mol) using a catalytic amount of $SnCl_4$. The product (402 g), diluted with 275 g chloroform and 175 g 1,1,2-trichlorotrifluoroethane, was metered into a fluorination reactor over a 20 hour period. The reactor, a 10 liter stirred tank, contained 5.7 liters 1,1,2-trichlorotrifluoroethane. During the course of the reaction the temperature was maintained near 20° C. while 20% fluorine was delivered to the reactor at a rate sufficient to react with all of the hydrogens on the product being pumped in. The fluorinated product (573 g, 89.8% yield) was separated from the solvent via an atmospheric distillation. The product was treated at 200° C. for 12 hours to remove any residual hydrogen and to convert any carbonyl groups present to difluoromethylenes. The portion of the product, approximately 25%, having a boiling point between 200° and 300° C. at 0.05 mm Hg was collected. The average molecular weight by $^{19}F$ NMR end group analysis was approximately 3000. The fluid had a pour point of −22° C.

| Viscosity Of Perfluoropolyepichlorohydrin Vacuum Pump Fluid | | |
|---|---|---|
| Temp. (°C.) | Viscosity (cst.) | Slope ASTM #D341 |
| 20 | 953.7 | |
| 80 | 26.54 | 0.763 |
| 150 | 4.11 | |

$^{19}F$ NMR of fraction boiling between 200° and 300° C. at 0.05 mm Hg (δ ppm vs $CFCl_3$);
−53.3(f), −67.2(e), −68.6(i), −74.2(a), −77.0 δ −81.0(c), −79.0(g), −87.3(b), −123.7(h), and −139.3(d).

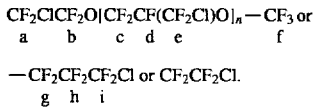

—$CF_2CF_2CF_2Cl$ or $CF_2CF_2Cl$.
   g     h      i

EXAMPLE 10

A random copolymer of perfluoro(propylene oxide) and perfluoroepichlorohydrin was prepared by treatment of perfluoropolyepichlorohydrin with fluorine at high temperatures. For example, 300 g of the product from the previous example was treated with 30% fluorine for 24 hours at 300° C. to give 285 g of fluid in which approximately 30% of the chlorine was replaced by fluorine. Average molecular weight by $^{19}F$ NMR end group analysis was 2800 a.m.u.

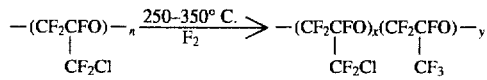

| Perfluoropoly(epichlorohydrin-propylene oxide) Copolymer $^{19}F$ NMR | |
|---|---|
| Structure | δ(Multiplicity) ppm vs $CFCl_3$ |
| $CF_3OCF(CF_2Cl)CF_2O$ | −53.3 (m) |
| $CF_2ClCF_2CF_2O$ | −66.3 (s) |
| $OCF(CF_2Cl)CF_2O$ | −67.0 (s) |
| $CF_2ClCF_2CF_2O$ | −68.6 (t) |
| $CF_2ClCF_2O$ | −74.3 (s) |
| $OCF(CF_2Cl)CF_2OCF(CF_2Cl)CF_2O$ | −76.8 (s) |
| $CF_2ClCF_2OCF_2CF(CF_2Cl)O$ | −79.7 (m) |
| $OCF_2CF(CF_3)O$ | −80.0 (s) |
| $OCF_2CF(CF_3)O$ | −81.0 (s) |
| $ClCF_2CF_2O$ | −87.3 (m) |
| $OCF(CF_2Cl)CF_2O$ | −139.3 (m) |
| $OCF(CF_3)CF_2O$ | −144.7 (m) |

EXAMPLE 11

Into a 10 liter, 3 neck flask equipped with a mechanical stirrer were charged 860 g 1,3-dichloro-2-propanol (617 mol) and 4 ml boron trifluorideetherate. To this solution was added 1.8 Kg epichlorohydrin (20 mol) over a 2 hour period as the temperature was maintained below 50° C. throughout the addition with a water bath. The mixture was stirred for an additional 12 hours at ambient temperature resulting in a very viscous oil.

A portion of the above epichlorohydrin telomer (1,660 g) was dissolved in 164 g chloroform containing 405 g 1,1,2-trichlorotrifluoroethane. The solution was metered into a 10 liter stirred fluorination reactor containing 5.0 liters of 1,1,2-trichlorotrifluoroethane. The reactor was held at 20° C. throughout the addition as fluorine gas (20%), diluted with nitrogen, was delivered at a rate slightly above that required to theoretically react with all of the organic feed. The reaction was complete in 36 hours. The crude product was recovered from the solvent by an atmospheric distillation. Treatment of the product with 30% fluorine at 200° C. for 12 hours resulted in 4100 g of an inert fluid of which approximately 80% boiled between 50° and 150° C. at 2 mm Hg. The fluid was shown by $^{19}F$ NMR end group analysis to have an average molecular weight of 850.
Density (37.8° C.): 1.7966 g/ml
Bulk modulus (37.8° C. and 3000 PSIG): 135,400 PSIG Elemental analysis calculated for an average structure of $C_{2.31}F_{4.46}Cl_{1.15}O(C_3F_5ClO)_{2.89}C_{2.31}F_{4.46}Cl_{1.15}$ C, 18.77; F, 52.26; Cl, 21.65

Found: C, 18.85; F, 53.13; Cl, 21.51%

| Viscosity of Perfluoropolyepichlorohydrin Type II Hydraulic Fluid (Dichloro end group) | |
|---|---|
| Temp (°F.) | Viscosity (cst.) |
| −65 | 1130 |
| 100 | 3.35 |

$^{19}$ F NMR ($\delta$ ppm vs CFCl$_3$)
−53.3(f), −65.6(a), −67.2(e), −68.6(k), −74.3(h), −77.0(c), −79.0(i), −87.3(g), −123.7(j), −135.2(b) and −139.3(d).

$(CF_2Cl)_2CFO[CF_2CF(CF_2Cl)O]_n-CF_3$ or
a    b   c  d  e      f $-CF_2CF_2CO$ or $-CF_2CF_2CF_2CO$
g  h      i  j  k

EXAMPLE 12

Trichloropentaerythritol was prepared by bubbling hydrogen chloride gas into a mixture of 600 g acetic acid and 100 g of water at 0° C. until 176 g had been absorbed (4.9 mol). This mixture was charged into an autoclave along with 200 g pentaerythritol (1.5 mol). The autoclave was sealed and heated to 160° C. for 8 hours. Upon completion of the reaction, the autoclave was cooled to room temperature and the reaction mixture was diluted with water. Trichloropentaerythritol acetate was isolated by extraction with methylene chloride. The solvent was removed and the residual oil was refluxed overnight with 500 ml of methanol and 50 ml of concentrated hydrochloric acid. Trichloropentaerythritol crystallized from the solution as the methanol and methyl acetate was slowly removed by distillation. The crude product (275 g) has a melting point of 60° C.

A 3 liter flask was charged with 267 g of trichloropentaerythritol and 1 ml of boron trifluorideetherate. To this was added 347 g of epichlorohydrin (3.75 mol) dropwise over a one hour period while the reaction temperature was maintained below 50° C. throughout the addition. The mixture was stirred for an additional 12 hours at ambient temperature resulting in a viscous oil.

The product (612 g), diluted with 210 g of chloroform and 217 g of 1,1,2-trichlorotrifluoroethane, was fluorinated in the usual manner in a 20° C. reactor containing 3.7 liters of 1,1,2-trichlorotrifluoroethane. The reaction was complete in approximately 30 hours. The fluid (1,460 g) was stabilized by treatment with 30% fluorine for 12 hours at 210° C. The fluid was distilled and the portion boiling between 170° C. and 230° C. at 50 mm Hg had a viscosity suitable for hydraulic fluid applications.

| Viscosity of Perfluoroepichlorohydrin Type III Hydraulic Fluid (Trichloro end groups) | |
|---|---|
| Temp (°F.) | Viscosity (cst.) |
| −65 | 1150 |
| 104 | 3.06 |
| 176 | 1.46 |

$^{19}$F NMR ($\delta$ ppm vs CFCl$_3$)
−48.7(a), −53.3(f), −67.2(e), −68.5(k), −74.3(h), −77.0(c), −78.8(i), −80.6(b), −87.3(g), −123.8(j) and −140(d).
Molecular Weight: 855

$(CF_2Cl)_3CCF_2O[CF_2CF(CF_2Cl)O]_n-CF_3$ or
a      b    c  d   e      f $-CF_2CF_2Cl$ or $-CF_2CF_2F_2Cl$
g  h     i  j  k

EXAMPLE 13

A low molecular weight polymer of 3,3-bis(chloromethyl)oxetane was prepared by mixing 200 g of 3,3-bis(chloromethyl)oxetane with a catalytic amount of boron trifluoride-etherate. The polymer was mixed with 1100 g sodium fluoride powder and placed in a 20 liter rotating aluminum reactor. The polymer was fluorinated at 0° C. with 20% fluorine in a 22 hour reaction. The reactor temperature was slowly increased to 80° C. over the next 20 hour period. The reactor contents were then exposed to pure fluorine (400 cc/min) for 10 hours. Upon completion of the reaction, the reactor was cooled and purged with several volumes of nitrogen prior to opening. The reaction mixture was extracted with 1,1,2-trichlorotrifluoroethane to give 310 g of a medium viscosity oil. The insoluble portion was mixed with water and refiltered to give 53 g of a solid polymer having a structure believed to be identical to that of the lower molecular weight fluid. The total yield was 363 g which corresponds to a yield of 94% based on the following structure:

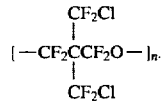

The fraction having a boiling point between 90° and 210° C. at 50 mm Hg was collected and considered as a potentially useful nonflammable hydraulic fluid. The fluid had a viscosity of 9.5 cst. at 100° F.

EXAMPLE 14

480 g of high molecular weight (1 million) polyethylene oxide was mixed with 2,400 g sodium fluoride powder (passed over a 100 mesh sieve) and placed in a rotating drum reactor. After purging for two hours at 3 liters per minute nitrogen flow, the fluorine flow was set at 480 liters per minute. These conditions were maintained for about 36 hours after which time the nitrogen flow was reduced to 1.5 liters per minute and the fluorine flow was held at 480 cc/min. These conditions were maintained for about 8 hours and then the nitrogen flow was cut off and the reactor contents were exposed to pure fluorine (480 cc/min) for 4 additional hours or until a significant amount of fluorine comes out of the reactor. The perfluoropoly(ethylene oxide)

was separated from the NaF/NaHF$_2$ by washing with approximately 15 gallons of water. About 1050 g of perfluoropoly(ethylene oxide) solids were obtained (83%).

EXAMPLE 15

200 g of polypropylene oxide (thick oil) was dissolved in 750 milliliters of methylene chloride and was mixed with 1500 g of sodium fluoride powder. After removal of the solvent the mixture was sieved through a 50 mesh sieve to give a more uniform particle size. Fluorination of the mixture using 200 cc/min fluorine with decreasing amounts of nitrogen (similar to the program used in the previous example) gave 160.5 g of oil which was soluble in 1,1,2,-trichlorotrifluoroethane ($^{19}$F NMR was very similar to that obtained for a Krytox™ fluid poly(hexafluoropropylene oxide) along with 240 g of perfluoropoly(propylene oxide) solids (total yield 69.9%).

EXAMPLE 16

A similar fluorination of a 70:30 ethylene oxide: propylene oxide copolymer (wax) was carried out. 480 g of copolymer was dissolved in 2 liters of methylene chloride and was coated on 2400 g of sodium fluoride powder. A gas flow of 300 cc/min fluorine and 3 liters per minute nitrogen was maintained for 36 hours. The nitrogen was decreased to 1 L/min for an additional 12 hours. The polymer was treated with pure fluorine for several hours prior to treatment with pure fluorine at 110° C. to remove the reactive end groups (6 hours). Extraction of the product with 1,1,2-trichlorotrifluoroethane gave 495 g oil. Removal of the NaF/NaHF$_2$ gave an additional 356 g of perfluoropolyether solids (total yield 64.1%).

EXAMPLE 17

Butoxyethoxyethanol (300 g, 1.85 mol) was treated with 200 g acetyl chloride (2.54 mol) to give an ester which was separated from the product mixture by distillation. A portion of the product (250 g) was diluted to a volume of 610 ml with 1,1,2-trichlorotrifluoroethane, then pumped into a −10° C. reactor over a 23 hour period. Fluorine gas, diluted with nitrogen, was delivered to the reactor which contained 5 liters of 1,1,2-trichlorotrifluoroethane and 1200 g sodium fluoride powder. Upon completion of the reaction, 160 g methanol was pumped into the reactor to give the methyl ester which is considerably more hydrolytically stable than the perfluoroester made in the reaction. The product (M.W. 460) was obtained in 96% yield.

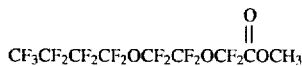

EXAMPLE 18

A diacetate ester of tetraethylene glycol was prepared by slowly adding 600 g acetyl chloride to 500 g tetraethylene glycol in a stirred 2-liter flask. Upon addition of the acetyl chloride, the reaction mixture was heated to 50° C. and held at that temperature for 24 hours. Dry nitrogen was bubbled through the flask for 24 hours to remove the hydrogen chloride, then the product was distilled to give a quantitative yield of the desired product.

The product from the above reaction (247.7 g) was fluorinated in a reactor containing 5 liters 1,1,2-trichlorotrifluoroethane and 120 g sodium fluoride. The reactor was held at −10° C. for approximately 20 hours as the organic was slowly pumped into the reactor. Upon completion of the addition, the unreacted fluorine was swept from the reactor with nitrogen gas and 200 g of methanol was added to give the following product in 93% yield (M.W. 466).

$^{19}$F NMR (δ ppm vs CFCl$_3$): −77.6(a) and −88.4(b).

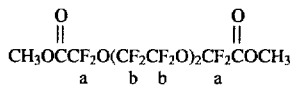

The above product was reduced with lithium aluminum hydride in tetrahydrofuran to give the expected methylol derivative in approximately 90% yield.

EXAMPLE 19

A diacetate ester of triethylene glycol was prepared by slowly adding 400 g acetyl chloride (5.1 mol) to 300 g triethylene glycol (2.0 mol) in a stirred 1 liter flask. The reaction mixture was kept below 50° C. throughout the addition. The product was recovered by first bubbling dry nitrogen through the solution to remove most of the hydrogen chloride followed by a distillation.

The product from the above reaction (250 g) was diluted to 600 ml with 1,1,2-trichlorotrifluoroethane then pumped into a −20° C. reactor containing 5 liters of 1,1,2-trichlorotrifluoroethane and 1200 g sodium fluoride powder. Fluorine, diluted with nitrogen, was bubbled through the liquid fluorination medium throughout the addition which required approximately 18 hours. After purging the reactor for approximately 30 minutes, 240 g methanol was added and the reactor was warmed to room temperature. Distillation of the reactor contents gave 355 grams (95% yield) of a product with the following composition.

$^{19}$F NMR (δ ppm vs CFCl$_3$): −77.6(a) and −88.3(b)

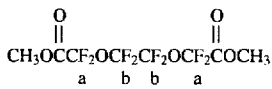

The dimethyl ester was reduced with lithium aluminum anhydride to give the methylol derivative.

$^{19}$F NMR (δ ppm vs CFCl$_3$): −80.3(a) and −89.0(b)

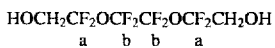

EXAMPLE 20

A 200 g sample of polypropylene glycol having an average molecular weight of 425 was diluted to 350 ml with 1,1,2-trichlorotrifluoroethane and slowly pumped into a 20° C. fluorination reactor over a 22 hour period. The reactor contained 4 liters of 1,1,2-trichlorotrifluoroethane as the fluorination liquid. In a separate vessel, 1000 g sodium fluoride pellets were placed. A teflon-diaphragm air pump was used to circulate the gases present in the reactor through the sodium fluoride bed and back into the fluorination reactor. Gas velocities in the recirculating loop of approximately 10 to 20 liters per minute were sufficient to sweep out most of the hydrogen fluoride formed in the reaction so that reasonable fluorination yields could be achieved. Following the reaction, 307 g of product (M.W. 1200) was isolated by distillation (53.7%).

EXAMPLE 21

In an experiment similar to the one previously described, 202 g polypropylene glycol (425 MW) was fluorinated in a reactor containing 3.7 liters of 1,1,2-trichlorotrifluoroethane. Once again, 1000 g sodium fluoride pellets were placed in a container which was connected to the fluorination reactor by a circulating gas loop. The reaction temperature was increased to 30° C. to see if the hydrogen fluoride could be removed more efficiently. The product (356 g) was isolated in 62.2% yield.

Unlike the isotactic perfluoropoly(propylene oxide) which can be made by polymerizing hexafluoropropylene oxide, the perfluorinated fluids described in this example and the previous one were atactic polymers of hexafluoropropylene oxide. The hexafluoropropylene oxide units were attached in a head to tail, head to head and tail to tail fashion. Because of the random structure of these fluids, slightly improved low temperature properties were typically obtained.

EXAMPLE 22

To a stirred solution consisting of 194 g tetraethylene glycol (1.0 mol) and 4.0 g of 50% sodium hydroxide was added 111 g acrylonitrile (2.1 mol). The reaction mixture was stirred for three hours at room temperature. 500 ml ethanol was added to the mixture followed by the slow addition of 214 ml of concentrated sulfuric acid (4.0 mol). Upon completion of the addition, the mixture was refluxed for seven hours, cooled, then filtered to remove the precipitated solids (NH$_4$HSO$_4$). The solids were washed with ethanol and the organic phase was combined with the ethanol rinse solution to give a mixture which upon distillation yielded a product with the following structure (90% yield):

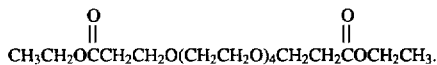

Fluorination of 305 grams of the polyether in a 10° C. reactor containing 5 liters of 1,1,2-trichlorotrifluoroethane and 1200 g sodium fluoride, followed by treatment with methanol gave 568 g of fluid (M.W. 798) having the following structure (92% yield):

EXAMPLE 23

In an experiment similar to the previous one, 194 g tetraethylene glycol (1.0 mol) was reacted with 140 g methacrylonitrile (2.1 mol) in the presence of 4.0 g 50% sodium hydroxide. Treatment of the resulting dinitrile with ethanol and concentrated sulfuric acid yielded the diethyl ester.

Fluorination of the diester (300 g) using a fluorination procedure similar to that described in the previous example gave 630 g of the product shown below (91% yield):

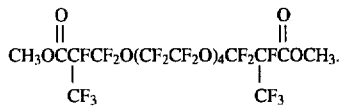

EXAMPLE 24

1,1,2,2-tetramethylethylene oxide was prepared by reacting 200 g tetramethylethylene with 450 g of 40% peracetic acid in 300 ml methylene chloride containing 400 g anhydrous sodium carbonate. The epoxide was polymerized with borontrifluoride etherate at −78° C. to give a hard, insoluble polymer which can be ground to a fine powder. The polymer (300 g) when mixed with 1200 g sodium fluoride powder and fluorinated in a 24 hour reaction at 10° C. gave approximately 160 g of an elastomeric product (17% yield) along with 642 g of a viscous fluid (68% yield).

EXAMPLE 25

Using the procedure outlined in Example 22, dipropylene glycol methyl ether was treated with acetonitrile to give a material which upon treatment with ethanol in the presence of sulfuric acid gave of material having the following structure:

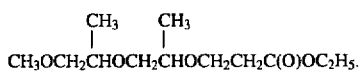

Fluorination of 213 g of the material in a −10° C. reactor containing 5.3 liters of 1,1,2-trichlorotrifluoroethane and 1050 g of sodium fluoride powder gave a perfluorinated ester which upon treatment with methanol gave 258 g of a functional fluid corresponding to the following structure:

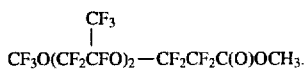

bp 75° C./15 mm Hg

EXAMPLE 26

Cyclohexene oxide (250 g) was polymerized in 1 liter of n-hexane at −0° C. using a catalytic amount of triethylaluminum. The reaction was complete in approximately 1 hour. The polymer was first washed with concentrated HCl, then water followed by several rinses with methanol.

Fluorination of the polymer (205 g) using the fluorination techniques outlined in previous examples gave 413 g of a perfluorinated fluid (71% yield):

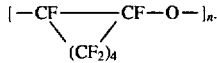

EXAMPLE 27

1,4-epoxycyclohexane was prepared by heating a mixture of 200 g hydroquinone with 200 g activated alumina. The mixture was slowly heated to approximately 120° C. over a 6 hour period. The product, 1,4-epoxycyclohexane boiled at 120° C. and was recovered in a 40% yield.

A polymer having an average molecular weight of approximately 2000 a.m.u. was prepared by polymerizing 1,4-epoxycyclohexane with a catalytic amount of trifluoromethane sulfonic anhydride. Fluorination of the polymer gave a 75% yield of a perfluoropolyether having the structure:

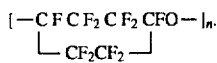

EXAMPLE 28

200 g polyoxetane was diluted to a volume of 500 ml and was slowly pumped into a 20° C. fluorination reactor containing 5 liters 1,1,2-trichlorotrifluoroethane and 1000 g sodium fluoride powder. The polymer was prepared via a ring opening polymerization of oxetane or by dehydration of 1,3-propanediol. The fluorinated product, 335 g, was recovered by first removing the sodium fluoride by filtration followed by distillation to remove the fluorination solvent. $^{19}$F NMR of a sample having a boiling point of 200°–300° C./0.05 mm Hg:

(δ ppm vs $CFCl_3$) −83.3 (s,a), −129.2 (s,b)

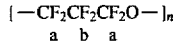
a  b  a

EQUIVALENTS

Those skilled in the art will recognize or be able to ascertain no more than routine experimentation many equivalents to the specific embodiments of the invention described herein. Such equivalents are intended to be encompassed by the following claims.

We claim:

1. A perfluorinated polyether having an average formula:

$$XO(Y—O)_n(Y'—O)_mZ$$

wherein Y is

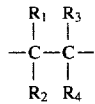

and Y' is selected from the group consisting of

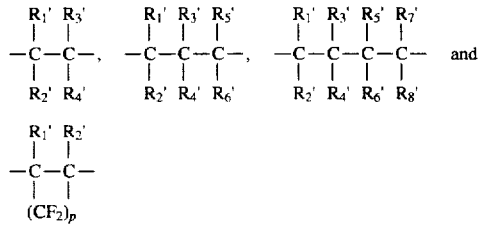

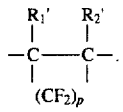

wherein p is an integer from 1 to 50; wherein $R_1$, $R_2$, $R_3$, $R_4$, $R_1'$, $R_2'$, $R_3'$, $R_4'$, $R_5'$, $R_6'$, $R_7'$ and $R_8'$, either separately or together, are F, perfluoroalkyl of one to twenty carbons or perfluoroalkyl ether of two to twenty carbons, wherein $R_2'$ and $R_8'$ when, taken together, can be $—CR_9R_{10}CR_{11}R_{12}—$, wherein $R_9$ through $R_{12}$ are the same or different and are selected from the groups given for $R_1'$ to $R_8'$; wherein X and Z are the same or different and are selected from the group consisting of perfluoroalkyls, perfluoroethers, perfluoropolyethers, fluoroalkyls terminated with fluoroacyl, carboxyl, amide or ester; methylols, acid chlorides, amides, amidines, acrylates and esters; wherein m is an integer from 0 to 10,000; and n is an integer from 5 to 10,000 with the proviso that each ether repeating unit contains at least one perfluoroalkyl or perfluoroalkyl ether of two to twenty carbon atoms and provided that the polyether does not consist essentially of 2. The perfluorinated polyether of claim 1 wherein X and Z are fluorinated alkyls selected from the group consisting of $—CF_3$, $—C_2F_5$, $—C_3F_7$ and $—C_4F_9$.

3. The perfluorinated polyether of claim 1 wherein X and Z are selected from the group consisting of $—(CF_2)_rCOF$, $—(CF_2)_rCOOH$, $—(CF_2)_rOCF_3$, $—(CF_2)_rCONH_2$, and $—(CF_2)_rC(O)OCH_3$, wherein r is an integer from 1 to 12.

4. The perfluorinated polyether of claim 1 wherein X and Z are selected from the group consisting of methylols, acid chlorides, amides, amidines, acrylates and esters.

5. The perfluorinated polyether of claim 4 wherein X and Z are selected from the group consisting of $—CF_2CF_2C(O)OR'$, $—CF_2CF(CF_3)C(O)OR'$, $—CF(CF_3)CF_2C(O)OR'$, and $—CF_2CF_2CF_2C(O)OR'$, wherein R' is a hydrocarbon or fluorocarbon which contains one to ten carbon atoms and which may contain one or more ether oxygens and/or chlorine substituents.

6. The perfluorinated polyether of claim 1 wherein n is an integer in the range of from 10 to 10,000.

7. The perfluorinated polyether of claim 1 wherein n is an integer in the range of from 15 to 10,000.

8. The perfluorinated polyether of claim 1 wherein n is an integer in the range of from 25 to 10,000.

9. The perfluorinated polyether of claim 1 wherein m is an integer in the range of from about 1 to 100.

10. The perfluorinated polyether of claim 1 having the formula:

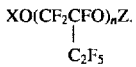

11. A lubricant comprising a perfluorinated polyether base oil of claim 1, and optional additives and fillers to enhance the performance of the lubricant.

12. A perfluorinated polyether having the formula:

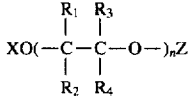

wherein X and Z are selected from the group consisting of perfluoroalkyls, perfluoroethers, perfluoropolyethers, fluoroalkyls terminated with fluoroacyl, carboxyl, amide or ester; methylols, acid chlorides, amides, amidines, acrylates and esters; wherein n is an integer from 5 and 10,000; wherein $R_1$, $R_2$, $R_3$ and $R_4$, either separately or together, are F, perfluoroalkyl of one to twenty carbons or perfluoroalkyl ether of two to twenty carbons, and with the proviso that each ether repeating unit contains at least one perfluoroalkyl or perfluoroalkyl ether of two to twenty carbon atoms.

13. The perfluorinated polyether of claim 12 wherein X and Z are fluorinated alkyls selected from the group consisting of $—CF_3$, $—C_2F_5$, $—C_3F_7$ and $—C_4F_9$.

14. The perfluorinated polyether of claim 12 wherein X and Z are selected from the group consisting of $—(CF_2)_rCOF$, $—(CF_2)_rCOOH$, $—(CF_2)_rOCF_3$, $—(CF_2)_rCONH_2$, and $—(CF_2)_rC(O)OCH_3$ wherein r is an integer from 1 to 12.

15. The perfluorinated polyether of claim 12 wherein X and Z are selected from the group consisting of methyols, acid chlorides, amides, amidines, acrylates and esters.

16. The perfluorinated polyether of claim 12 wherein X and Z are selected from the group consisting of —CF$_2$CF$_2$C(O)OR', —CF$_2$CF(CF$_3$)C(O)OR', —(CF(CF$_3$)CF$_2$C(O)OR', and —CF$_2$CF$_2$CF$_2$C(O)OR', wherein R' is a hydrocarbon or fluorocarbon which contains one to ten carbon atoms and which may contain one or more ether oxygens and/or chlorine substituents.

17. The perfluorinated polyether of claim 12 wherein n is an integer in the range of from 10 to 10,000.

18. The perfluorinated polyether of claim 12 wherein n is an integer in the range of from 15 to 10,000.

19. The perfluorinated polyether of claim 12 wherein n is an integer in the range of from 25 to 10,000.

20. A perfluoropolyether having a linear chain structure consisting essentially of a total of at least five repeating units, which includes —YO— and —Y'O—, wherein Y is CR$_1$R$_2$CR$_3$R$_4$ and Y' is selected from CR$_1$'R$_2$'CR$_3$'R$_4$', CR$_1$'R$_2$'CR$_3$'R$_4$'CR$_5$'R$_6$', or CR$_1$'R$_2$'CR$_3$'R$_4$'CR$_5$'R$_6$'CR$_7$'R$_8$', wherein R$_1$, R$_2$, R$_3$, R$_4$, R$_1$', R$_2$', R$_3$', R$_4$', R$_5$', R$_6$', R$_7$' and R$_8$' in each repeating unit is F, perfluoroalkyl of one to twenty carbons or perfluoroalkyl ether of two to twenty carbons, wherein the total number of ether repeating units is at least five with the proviso that each ether repeating unit contains at least one perfluoroalkyl or perfluoroalkyl ether of two to twenty carbon atoms.

21. The perfluoropolyether of claim 20 wherein the perfluoropolyether has at least ten repeating units.

22. The perfluoropolyether of claim 20 wherein the perfluoropolyether has at least fifteen repeating units.

23. A perfluorinated polyether having an average formula:

XO(Y—O)$_n$(Y'—O)$_m$Z wherein Y is

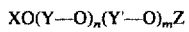

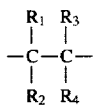

and Y' is selected from the group consisting of

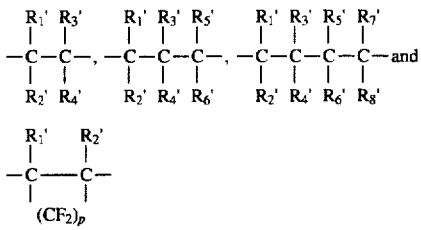

wherein p is an integer from 1 to 50; wherein R$_1$, R$_2$, R$_3$, R$_4$, R$_1$', R$_2$', R$_3$', R$_4$', R$_5$', R$_6$', R$_7$' and R$_8$' in each repeating unit are F, perfluoroalkyl of one to twenty carbons or perfluoroalkyl ether of two to twenty carbons, wherein X and Z are the same or different and are selected from the group consisting of —(CF$_2$)$_r$OCF$_3$, —(CF$_2$)$_r$COF, —(CF$_2$)$_r$COOH, —(CF$_2$)$_r$C(O)OCH$_3$, and —(CF$_2$)$_r$CONH$_2$, wherein r is an integer from 1 to 12, perfluoroalkyls, perfluoroethers and perfluoropolyethers; wherein m is an integer from 0 to 10,000; and n is an integer from 5 to 10,000 with the proviso that each ether repeating unit contains at least one perfluoroalkyl or perfluoroalkyl ether of two to twenty carbon atoms and provided that the polyether does not consist essentially of

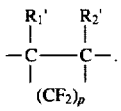

24. The perfluorinated polyether of claim 23 wherein n is an integer from 10 to 10,000.

25. The perfluorinated polyether of claim 23 wherein n is an integer from 15 to 10,000.

* * * * *